June 1, 1948.  H. D. CURTIS  2,442,344
PORTABLE DEHYDRATING APPARATUS WITH A PERFORATED FLOOR
Filed May 21, 1945  2 Sheets-Sheet 1

INVENTOR
HARRY D. CURTIS
BY
ATTORNEYS

INVENTOR
HARRY D. CURTIS

ATTORNEYS

Patented June 1, 1948

2,442,344

UNITED STATES PATENT OFFICE 2,442,344

PORTABLE DEHYDRATING APPARATUS WITH A PERFORATED FLOOR

Harry D. Curtis, Fond du Lac, Wis., assignor of one-half to Simon Schaefer, Fond du Lac, Wis.

Application May 21, 1945, Serial No. 594,938

1 Claim. (Cl. 34—233)

My invention has for its primary object to provide a simple, effective method and apparatus for dehydrating farm products by employing a series of bodies containing the green product for simultaneous heat treatment.

Another object of my invention is to provide a portable heating plant provided with a trunk attachment, for coupling thereto, a series a portable enclosed bodies or housings, containing the product to be dehydrated, the trunk being provided with a plurality of by-pass nozzles, whereby the contents of the various bodies are cured in a comparatively short time.

Another object of my invention is to provide a flexible master trunk for conveying heat simultaneously to a series of portable bodies, having a plurality of valve controlled nozzles adapted to be quickly coupled to the bottoms of the enclosed body units, it being understood that said body units are mounted upon wheeled or runner wagon gear, either of a four wheel type or two wheel trailer type, whereby they are conveniently transported from the field to the heating plant.

With the above and other minor objects in view, my invention consists in certain peculiarities of construction and combination of parts as will be hereinafter set forth with reference to the accompanying drawings and subsequently claimed.

Figure 1:
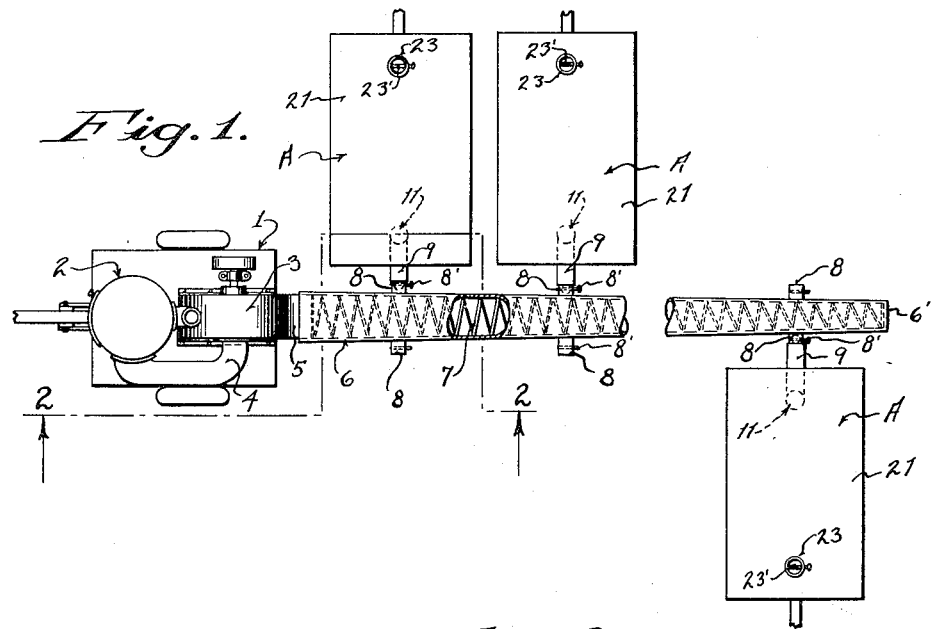
Figure 1 represents a diagrammatic plan view of an apparatus embodying the features of my invention.
Figure 2:
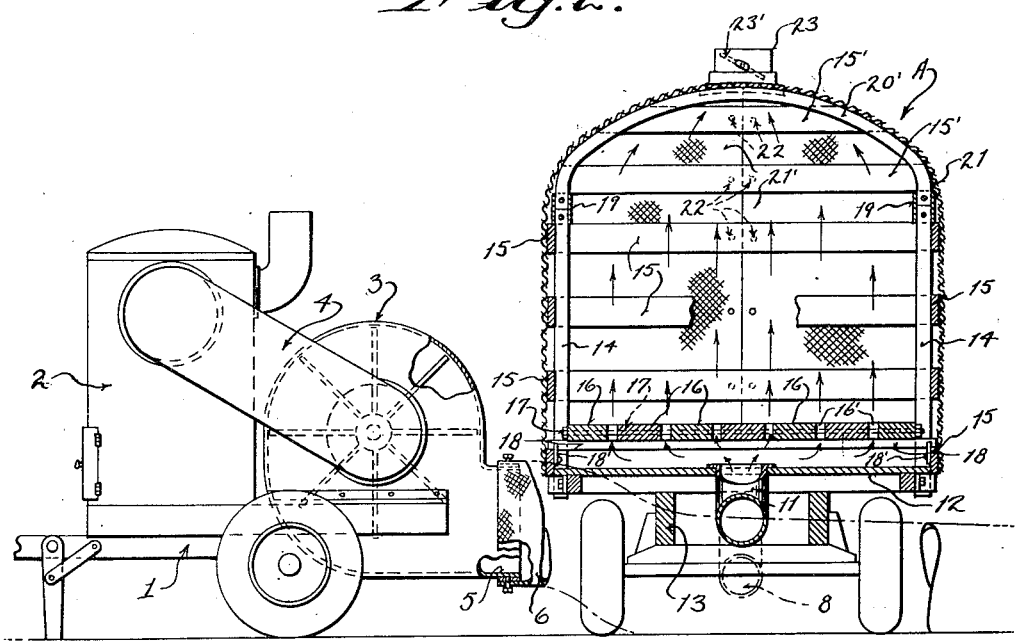
Figure 2 is a cross sectional view of an enclosed housing or body associated with a portable heating plant embodying the features of my invention, the section being indicated by line 2—2 of Figure 1.

Referring by characters to the drawings, as indicated in Figures 1 and 2, I provide a wheeled trailer 1, having mounted thereon a hot air heating furnace 2, of any desired type, and a motor driven blower fan 3, which fan, at its center portion, is connected to the dome of the heating furnace by a pipe 4. The discharge mouth 5 of the blower fan is coupled, by suitable means, to the inner end of a flexible trunk 6. The trunk may be fabricated from chemically treated canvas and it tapers slightly from the fan to its closed end 6'.

In order to support the walls of the trunk, I provide an internal spiral wire 7 which extends throughout the length of said trunk. It is understood, however, that various reinforcing elements for the trunk may be employed.

Figure 3:
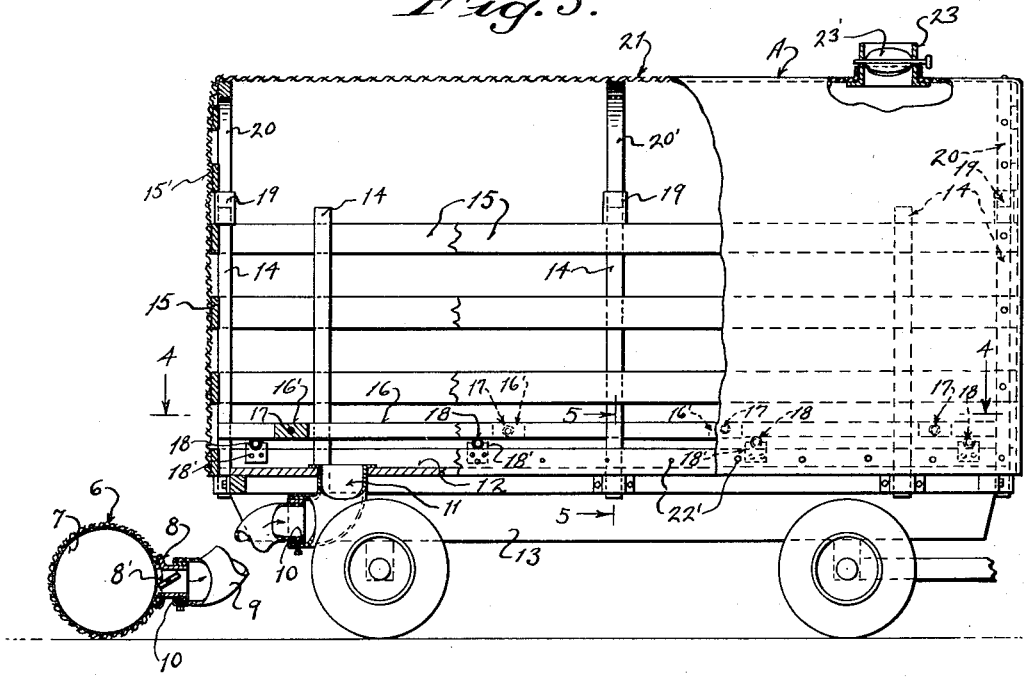
Figure 3 is a longitudinal partial sectional view of the body having attached thereto a heat conveyor trunk, the section being indicated by line 3—3 of Figure 4.
Figure 4:
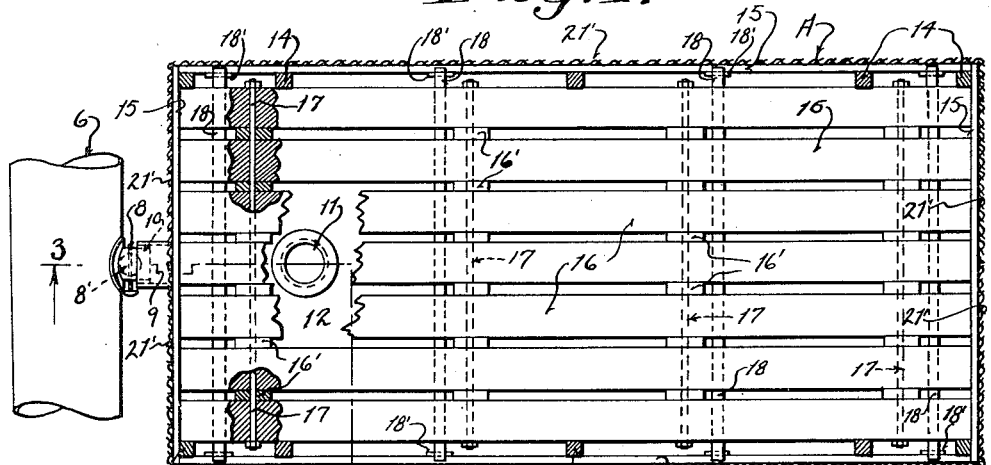
Figure 4 is a plan sectional view of the same, the section being indicated by line 4—4 of Figure 3.
Figure 5:
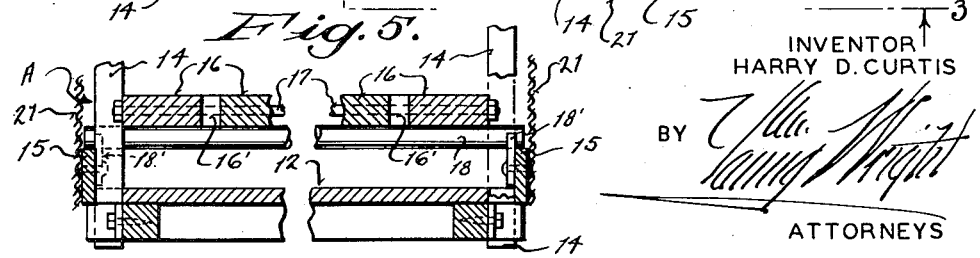
Figure 5 is an enlarged detailed cross sectional view illustrating the bottom construction of said body, the section being indicated by line 5—5 of Figure 3.

The trunk 6 is provided with a series of laterally extended discharge nozzles 8, each of which is equipped with a butterfly valve 8', whereby the nozzles may be closed when not in use. As best shown in Figures 1 and 3 of the drawings, when the apparatus is in use, a series of portable wheel mounted bodies A are aligned upon opposite sides of the trunk and each of the same is temporarily connected to the master trunk by a flexible by-pass pipe 9, it being understood that these by-pass pipes are similarly constructed to the trunk. Each by-pass pipe is provided with a metal band reinforced mouth 10—10, one of which is detachably coupled to the trunk nozzle 8, and the other end mouth is similarly coupled to a hot air receiving elbow 11.

The elbow 11 extends through and is attached to the standard floor 12 of a hay rack and said hay rack is mounted upon a wheeled running gear 13 of any standard type, such as are usually employed in wagon structures. The hay rack is provided with the usual stakes 14, which stakes are connected by spaced side and end boards 15, all of which structure forms no part of my invention, except that it is a foundation for an enclosed housing or body which may be removed from the hay rack, when said hay rack is employed for ordinary farm use.

To convert the standard hay rack into a closed housing or body, I provide a removable floor, comprising a series of longitudinally spaced panels 16 and said panels have aligned series of spacing blocks 16', which blocks and panels are secured together by binding bolt rods 17 passing through the several parts.

In order to support the removable vented flooring, I provide a series of transversely disposed pipes 18 and the ends of the same are socketed in metallic brackets 18', which brackets are secured to the upper edge of the lower side boards 15. Certain of the hay rack stakes have fitted to their upper ends socket thimbles 19, for the reception of bows 20—20—20', as best indicated in Figures 2 and 3 of the drawings. The end bows 20—20 are suitably braced by spaced cross boards 15'. The above mentioned bows form supports for a one piece canvas cover 21, having divided end sections 21', which are closed by buttons or snaps 22 carried by the cross boards 15—15'.

The downwardly folded sides of the canvas cover are secured by buttons or clips 22' to the lower boards 15 which rim the bottom 12 of the hay rack. Thus it will be seen that the farm hay rack can readily be converted into an air tight enclosed housing or body, for the reception of any green product to be dehydrated, and it is understood that the canvas cover may be suitably treated for closure of its pores.

As indicated especially in Figures 2 and 3 of the drawings, the cover 21 has secured therein, near its upper end, a vent pipe section 23, which pipe section is provided with a butterfly valve 23' for closing and opening the vent.

While I have described the portable enclosed knock-down body minutely as to detail, it is understood that I may vary the structural features of this body, when it is not fabricated from a standard hay rack. For example, small enclosed special bodies may be utilized, when mounted upon an inexpensive two wheel running gear, in the form of a trailer.

While the above described apparatus and method employed, for dehydrating, may be sold directly to farmers, it is contemplated that in communities where small farms predominate, a full equipment may, for example, be purchased by one party and rented out from farm to farm, to thus materially reduce the cost of dehydrating farm produce such as hay, alfalfa and like products, which may be dehydrated by subjecting the same to heated air at a temperature of approximately 100°. However, for dehydrating green or sappy wood, a longer period of heat treatment may be required.

In the operation the portable heating unit, with its flexible trunk, may be located upon any convenient yard and the portable housing bodies will transport the products from remote fields to the heating unit. The bodies are then connected to the master trunk, by a series by coupling pipes 9, which contains hot air, delivered by the blower from the heating furnace 2. It is understood that the master trunk is extended outwardly from the heating unit and normally will rest upon the ground.

These nozzles 8 of the master trunk, which are not in use, are manually closed by the valves 8'. The valves of those nozzles, which are in use, are open and hence hot air will be discharged below the false ventilated bottom composed of spaced panels 16. Thus the hot air will be uniformly distributed to the bottom of the hay load, for example, whereby in a prescribed time, the hay load will be entirely dried, or cured.

In the method of dehydrating it will be noted that the hot air passing upwardly through the load of hay will absorb moisture and become humid. Hence, in order to eliminate this humid air, which will rise to the dome of the canvas cover, the valve controlled vent pipe 23 may be manipulated to discharge said humidified air.

In some instances it is contemplated to utilize this humid hot air by connecting the vent pipe section to the furnace by any suitable conducting pipe (not shown), whereby economy in heating is obtained by collecting and utilizing the hot humid air which would otherwise be entirely wasted.

It is manifest that after dehydration of a load of hay, the same may be disconnected from the master trunk and transported to the storage barn.

While I have shown and described one form of removable vented bottom for the support of the body load, it is apparent that any suitable false bottom structure may be employed for the purpose specified. In practice, the hay racks, when collecting a harvest, have their flexible covers removed to permit ready loading. When the load is delivered to the heating plant yard, the flexible cover is folded over the bowed frames and side walls of the hay rack to fully enclose the same before the product is subjected to hot air.

Changes in details may be made without departing from the spirit or the scope of my invention, but what I claim as new is:

In a convertible hayrack body for dehydrating farm products including a solid floor having a hot air pipe in communication therewith, side boards, stakes extending upwardly therefrom; the combination of a dehydrating attachment comprising brackets secured to the side boards, transversely disposed pipes fitted into the brackets, a vented floor mounted upon the pipes, the same including longitudinal panels, spacing blocks between the panels, securing rods extending through the spacing blocks and panels, socket thimbles carried in the ends of the body stakes, bows having end fitted into the stake sockets and a canvas cover encasing the body stakes and bows.

HARRY D. CURTIS.

REFERENCES CITED

The following references are of record in the file of this patent:

UNITED STATES PATENTS

| Number | Name | Date |
|---|---|---|
| 61,393 | Burns | Jan. 22, 1867 |
| 253,556 | Randall | Feb. 14, 1882 |
| 304,015 | Mahan | Aug. 26, 1884 |
| 626,579 | Viele | June 6, 1899 |
| 508,363 | Blair | Nov. 7, 1893 |
| 1,303,945 | Nichols | May 20, 1919 |
| 1,323,416 | Simpson | Dec. 2, 1919 |
| 1,512,052 | Richardson | Oct. 21, 1924 |
| 1,579,239 | Owen | Apr. 6, 1926 |
| 1,580,767 | Skromme | Apr. 13, 1926 |
| 2,039,834 | Petersen | May 5, 1936 |
| 2,196,391 | Gronert | Apr. 9, 1940 |
| 2,365,940 | Couse | Dec. 26, 1944 |

FOREIGN PATENTS

| Number | Country | Date |
|---|---|---|
| 2,486 | Great Britain | 1866 |
| 3,271 | Great Britain | 1912 |
| 132,237 | Switzerland | June 17, 1929 |
| 200,888 | Great Britain | July 18, 1923 |
| 324,380 | Great Britain | Jan. 27, 1930 |
| 497,022 | Germany | May 1, 1930 |
| 504,259 | France | Apr. 9, 1920 |